(No Model.) 2 Sheets—Sheet 1.

J. COLLINS,
ART OF SPLICING CABLES.

No. 386,690. Patented July 24, 1888.

Witnesses:
Geo. H. Strong.
J. H. Krouse.

Inventor:
John Collins,
By Dewey & Co.
Attys (No Model.) 2 Sheets—Sheet 2.
J. COLLINS.
ART OF SPLICING CABLES.
No. 386,690. Patented July 24, 1888.
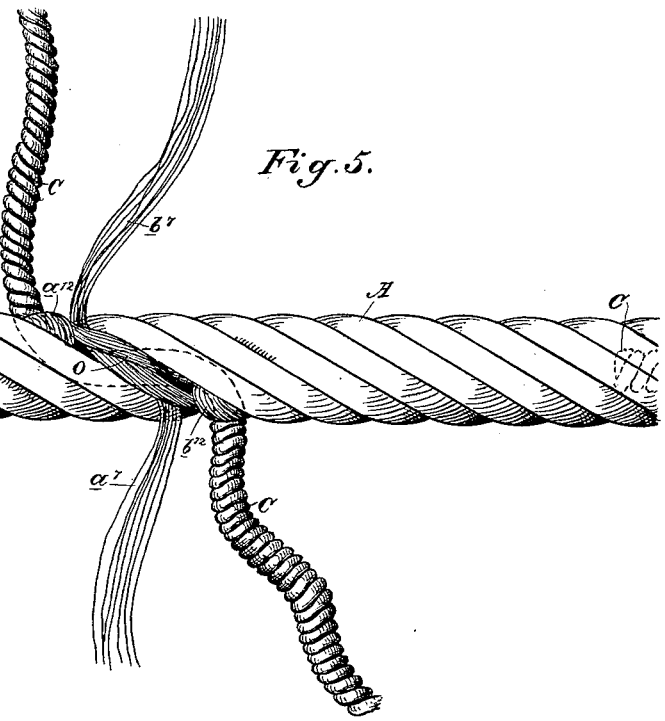
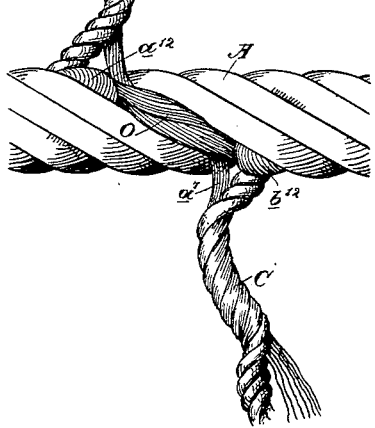
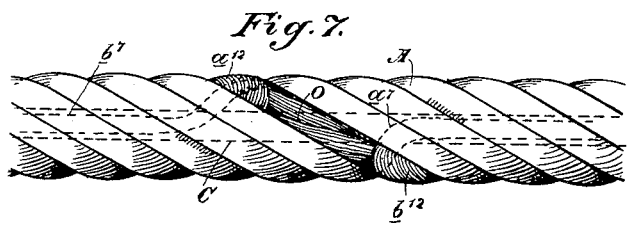
Witnesses,
Geo. H. Strong.
J. H. Rouse.
Inventor,
John Collins.
By Dewey & Co.
attys.

UNITED STATES PATENT OFFICE.

JOHN COLLINS, OF SAN FRANCISCO, CALIFORNIA.

ART OF SPLICING CABLES.

SPECIFICATION forming part of Letters Patent No. 386,690, dated July 24, 1888.

Application filed December 22, 1887. Serial No. 258,770. (No model.)

*To all whom it may concern:*

Be it known that I, JOHN COLLINS, of the city and county of San Francisco, and State of California, have invented an Improvement in the Art of Splicing Cables; and I hereby declare the following to be a full, clear, and exact description thereof.

My invention relates to the art of splicing cables, and particularly to that mode or method which, from the disposition of the strand ends or tucks, is known as "inlaid."

My invention consists in dividing the opposing strand ends or tucks back to their union with the cable, cutting off even with surface of the cable one division of each tuck; taking one or more half-turns with the lay of the remaining divisions, one from each side, so as to form a splice strand occupying the vacant score of the cable; severing the soft core of the cable at points beyond each end of the newly-formed splice-strand, and taking out from the cable the ends of the severed section of the core back to each end of the splice-strand, leaving it untouched under the said strand; wrapping the ends of the divisions of the splice-strand with said core; and, finally, inlaying the core ends and the divisions about which they are wrapped into the heart of the cable, all of which I shall hereinafter fully describe.

The object of my invention is to make a simple and effective inlaid splice without having to permanently remove the soft core of the cable.

Figure 1:
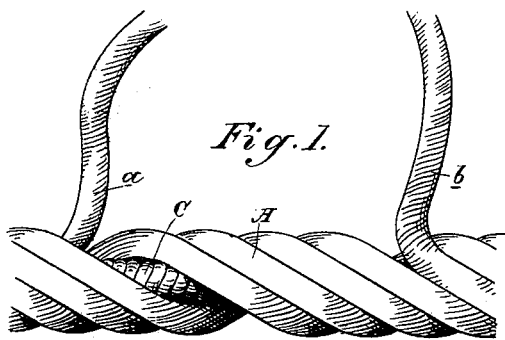
Figure 2:
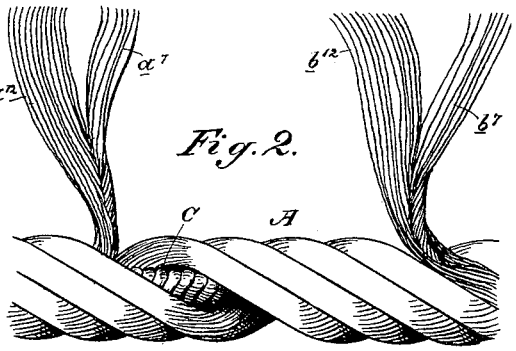
Figure 3:
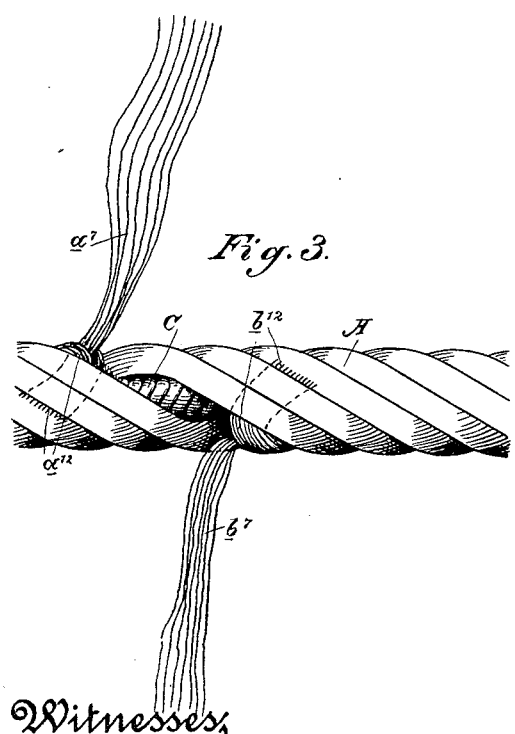
Figure 4:
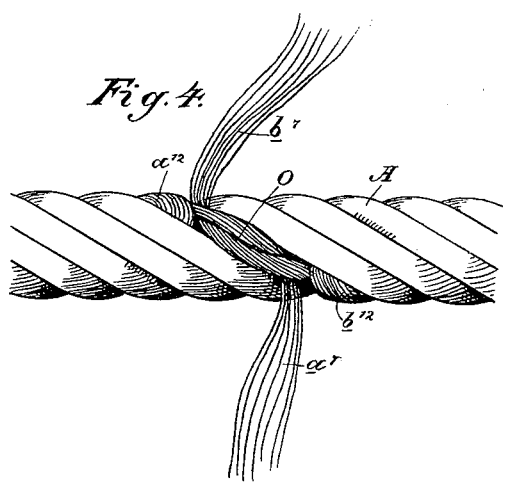

Referring to the accompanying drawings, Figure 1 is a view showing a section of the cable and one pair of opposing strand ends or tucks. Fig. 2 is a view showing the division of the strand ends or tucks. Fig. 3 is a view showing the cutting-off of one of the divisions on each side even with the surface of the cable. Fig. 4 is a view showing the laying up together of the remaining divisions to form a splice-strand occupying the vacant score of the cable. Fig. 5 is a view showing the taking out from the cable of the ends of the severed section of the soft core back to the ends of the splice-strand. Fig. 6 is a view showing the projecting ends of the splice-strands of the divisions wrapped with the ends of the severed section of the soft core. Fig. 7 is a view of the cable with the splice completed, the wrapped ends of the spliced-strand divisions being inlaid in the heart of the cable.

I deem it unnecessary herein to illustrate or particularly describe the primary steps by which the cable is reduced to the condition shown in Fig. 1. These steps are all well known in the art of splicing, and it will be sufficient to state, generally, that the strands of the opposing ends of the cable, being first unlaid, are then interlocked and alternate strands from each side are laid back to varying distances, followed by the opposing strands laid up into scores thus formed until, along the whole length of the general splice, the cable presents a number of opposing strand ends or tucks, one pair of which, as before stated, is shown in Fig. 1.

The problem which now presents itself to the splicer is the proper disposition of these strand ends or tucks. One general division of the method in use is known as "inlaid," and consists in disposing of the tucks in the heart of the cable; but this has heretofore required the removal of the soft core of the cable in order to make room for the tucks. My invention contemplates avoiding the removal of this core and yet providing for the complete inlaid splice.

A is the cable. $a$ is one of the strand ends or tucks, and $b$ is the other. After the strand ends or tucks are brought up to oppose each other, as shown in Fig. 1, I divide each, as shown in Fig. 2, back to their point of union with the cable. As in this drawing I have shown the strand as composed of nineteen wires, and have divided each strand end into divisions consisting of seven wires and twelve wires, I will, for the sake of clearness, designate these divisions by $a^7 a^{12} b^7 b^{12}$. In a nineteen-wire strand there are seven inner or core wires surrounded by the twelve outer wires. In making my divisions I prefer to observe this arrangement, so that in splicing the strand ends or tucks I form one division of the twelve outer wires and the other division of the seven core wires. This is clearly shown in Fig. 2. My next step is to cut off the divisions $a^{12}$ and $b^{12}$ (which may or may not be first tucked under adjacent strands) even with the surface of the cable, as shown in Fig. 3, so that this much of each strand end or tuck is disposed of. I now bring together divisions $a^7$ and $b^7$, taking one or more turns with the lay—that is to say, twisting them together, so that each shall occupy the score left vacant by the untwisting of the wires which had previously occupied said score, thus forming a splice-strand, which I designate by the letter O, and which occupies the vacant score of the cable, as shown in Fig. 4. I now cut the soft core C of the cable beyond each end of the splice-strand at points determined by the length of the projecting ends of the splice-strand divisions, and, with my needle, I take out from the cable the ends of the severed section of soft core back to the ends of the splice-strand, and in thus removing the core ends from the cable I bring it out between such strands as will direct it properly to the ends of the newly-formed splice-strand. This I have shown in Fig. 5; and it will now be seen that directly under the splice strand the soft core is left untouched and in proper position, though both its ends are brought out from the cable. I now wrap the ends of the splice-strand with the ends of the soft core, and in thus wrapping I adopt a peculiar method for the purpose of avoiding too great a diameter, which would be caused by wrapping the wires with the core in its normal condition—that is to say, I now unlay the soft core into its component strands and wrap each strand independently and separately about the wires with a long curve, so that I am enabled to stretch them very nearly, if not wholly, throughout the length of the strand ends, and yet keep the diameter down to the required degree. Having thus wrapped the strand ends, as shown in Fig. 6, I next inlay them both in the center of the cable, as shown in Fig. 7, whereby, it will be perceived, the soft core is returned to its position while the strand ends are inlaid.

Having thus described my invention, what I claim as new, and desire to secure by Letters Patent, is—

1. In the art of splicing cables, the method of treating and disposing of the strand ends or tucks, which consists in wrapping a division of each of the opposing strand ends or tucks, after said divisions have been laid up to form the new strand occupying the vacant score, with the ends of a severed section of the soft core of the cable, cutting off even with the surface of the cable the other divisions of the strand ends or tucks, and then inlaying the wrapped divisions in the heart of the cable, whereby the ends of the core-section are returned to place and the tucked divisions disposed of, substantially as described.

2. In the art of splicing cables, the method of treating and disposing of the strand ends or tucks, which consists in dividing them back to their union with the cable, cutting off even with the surface of the cable one of the divisions of each tuck, laying up the remaining divisions so as to form a splice strand occupying the vacant score of the cable, severing the soft core of the cable at points beyond each end of the newly-formed splice-strand, and taking out from the cable the ends of the severed section of the core back to each end of the splice-strand, wrapping the ends of the divisions of the splice strand with said core, and, finally, inlaying the core ends and the divisions about which they are wrapped into the heart of the cable, substantially as described.

In witness whereof I have hereunto set my hand.

JOHN COLLINS.

Witnesses:
S. H. NOURSE,
H. C. LEE.